J. Uhl.

Saw-Set.

N° 81,708.    Patented Sept. 1, 1868.

Witnesses.
Wm A Morgan
G. C. Cotton

Inventor:
J. Uhl
per Munn & Co
Attorney

United States Patent Office.

JOHN UHL, OF BROOKLYN, NEW YORK.

Letters Patent No. 81,708, dated September 1, 1868.

---

IMPROVEMENT IN SAW-SET.

---

*The Schedule referred to in these Letters Patent and making part of the same.*

---

TO ALL WHOM IT MAY CONCERN:

Be it known that I, JOHN UHL, of 61 School street, Brooklyn, county of Kings, and State of New York, have invented a new and improved Saw-Set; and I do hereby declare that the following is a full, clear, and exact description thereof, which will enable others skilled in the art to make and use the same, reference being had to the accompanying drawings, forming a part of this specification.

Similar letters of reference indicate corresponding parts.

Figure 1:
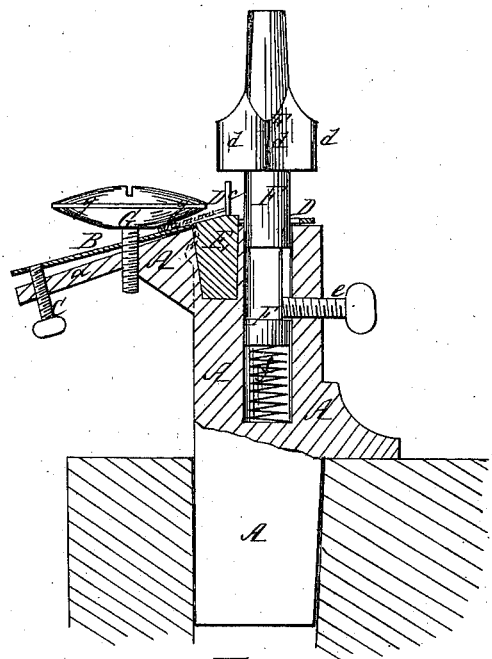
Figure 1 represents a side elevation, partly in section, of my improved saw-set.

This invention relates to a new saw-set, which is of very simple construction, and which can be adjusted to any-sized saw or shaped tooth.

It consists of a block, to be fastened in suitable manner to any table or other support, said block being provided with an adjustable rest for the saw, with a sliding, adjustable abutting plate, whereby the length of tooth to be set is regulated with a screw, which has a conical head for guiding narrow saws, with a removable anvil, and with a punch, which has a series of projecting ribs of different widths, either of which can be used, according to the width of the tooth to be set.

The punch is constantly held up by means of a spring, so that the saw can be freely fed, and is, when the required tooth is on the anvil, brought down by suitable mechanism to set each tooth.

The punch has a polygonal shank, so that it can, by means of a set-screw or pin, be prevented from turning automatically when in operation.

A, in the drawing, represents a block, of suitable size and shape, made of cast iron or other suitable material, in such a manner that it can be easily fastened to a table or any other suitable support.

The surface of the block A is smooth and level, except in front, where it forms an inclined platform, $a$.

To the highest part of this platform $a$ is hinged or otherwise attached a swinging plate, B, which forms the support of the saw to be set.

C is a screw, put through the front part of the platform $a$, and swivelled to the plate B. By its means the plate B can be adjusted up and down, so as to hold the saw in any inclined position. The set of the saw is thus regulated by means of the plate B and screw C.

D is a slotted plate, held, by means of screws $b\ b$, upon the level portion of the block A. It is provided with an upward-projecting ledge, $c$, in front, and serves to adjust the position of the saw as regards the length of tooth to be set.

E represents the anvil. The same can be made of a separate piece of steel, and be inserted in the block A, as shown at the junction of the inclined and level planes of the same.

Figure 2:
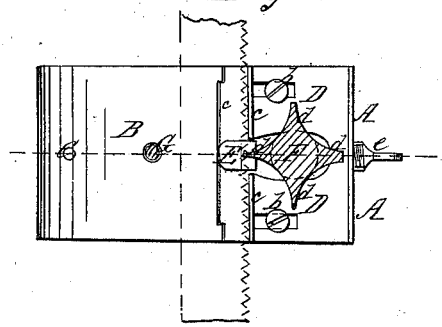
Figure 2 is a plan or top view, partly in section, of the same.

Behind the anvil E is formed, in the block A, a hollow or socket, for the reception of the shank of the punch F. On the upper part of this punch is formed a series of projecting ribs, $d\ d$, of different thicknesses, as shown in fig. 2. A portion of or the whole shank of the punch may be made polygonal, as shown, the number of sides corresponding to the number of ribs $d$ on the upper part of such punch; or other means may be employed in connection with a set-screw or pin, $e$, to prevent the punch from turning in its socket without preventing its up-and-down motion.

The punch rests on and is held up by a spring, $f$, as shown in fig. 1.

When a tooth of a saw to be set is placed upon the anvil, the punch is brought down with a suitable degree of force, and is then at once automatically raised again by the spring $f$, so that the rib is not in the way while the saw is being laterally displaced.

For teeth of different width, the punch is first adjusted by being turned in the socket, so as to bring a rib of the required thickness into working position.

A screw, G, with a head, $g$, of inverted conical form, is or may be applied to the block A, in the manner shown in fig. 1, to guide narrow saws, which could not conveniently be held in place with the fingers.

The narrower the saw, the lower will this screw G be set, so as to form a support for the back edge of the saw.

Having thus described my invention, what I claim as new, and desire to secure by Letters Patent, is—

The construction and arrangement of block A, swinging table B, screw G, adjustable plate D, anvil E, punch $d$, holding-device $e$, spring $f$, substantially as herein described and for the purpose specified.

JOHN UHL.

Witnesses:
FRANK BLOCKLEY,
ALEX. F. ROBERTS.